United States Patent
Sikorski (10) Patent No.: US 10,781,840 B2
(45) Date of Patent: Sep. 22, 2020

(54) DOUBLE SHEAR BONDED JOINT AND METHOD FOR MAKING SAME

(71) Applicant: Safran Seats USA LLC, Gainesville, TX (US)

(72) Inventor: Jeffrey L. Sikorski, Melissa, TX (US)

(73) Assignee: Safran Seats USA LLC, Gainesville, TX (US)

( * ) Notice: Subject to any disclaimer, the term of this patent is extended or adjusted under 35 U.S.C. 154(b) by 127 days.

(21) Appl. No.: 15/305,685

(22) PCT Filed: Apr. 24, 2015

(86) PCT No.: PCT/US2015/027454
§ 371 (c)(1),
(2) Date: Oct. 21, 2016

(87) PCT Pub. No.: WO2015/164704
PCT Pub. Date: Oct. 29, 2015

(65) Prior Publication Data
US 2017/0045068 A1    Feb. 16, 2017

Related U.S. Application Data

(60) Provisional application No. 61/983,610, filed on Apr. 24, 2014.

(51) Int. Cl.
*F16C 11/00* (2006.01)
*B29C 65/52* (2006.01)
(Continued)

(52) U.S. Cl.
CPC ........ *F16B 11/008* (2013.01); *B29C 66/5221* (2013.01); *Y10T 403/473* (2015.01)

(58) Field of Classification Search
CPC .. Y10T 403/47; Y10T 407/473; F16B 11/008; F16B 17/004; F16B 7/042;
(Continued)

(56) References Cited

U.S. PATENT DOCUMENTS 332,754 A * 12/1885 Scott ................. F16L 47/04
285/331
3,771,820 A * 11/1973 Hoss, Sr. ............ F16L 13/103
285/373
(Continued)

FOREIGN PATENT DOCUMENTS

DE           3132828 A1 *  3/1983   ............ F16B 11/008
DE    102012018069 A1 *  3/2014   ............ F16L 13/02
(Continued)

OTHER PUBLICATIONS

Translation of JP 07-301374. Osamu, et al. Connecting Method of Multilayer Pipe. Nov. 14, 1995.*
(Continued)

*Primary Examiner* — Josh Skroupa
(74) *Attorney, Agent, or Firm* — Kilpatrick Townsend & Stockton LLP (57) ABSTRACT

Channel joints (1) can permit bonding a tube or tubular member (30) to an end fitting (20) in double shear. The channel joint may include a receiving channel (25) in the end fitting (20) that is complementary in shape to the tube, tubular member, or other hollow member (30) that is to be fitted and bonded with the end fitting. The use of a channel joint allows for simplified assembly because the receiving channel acts as a reservoir for the bonding agent or adhesive (50). Upon insertion of the tube, tubular member, or other hollow member into the adhesive-loaded receiving channel, the adhesive will backflow to fill the voids in the joint and expel the excess adhesive.

22 Claims, 8 Drawing Sheets

(51) Int. Cl.
*F16B 11/00* (2006.01)
*B29C 65/00* (2006.01)

(58) Field of Classification Search
CPC ...... F16B 7/0406; F16B 7/0413; F16D 1/027; F16D 1/068; F16D 2250/0069; F16L 13/103; F16L 13/116; F16L 13/10; F16L 13/11; F16L 47/02; B29C 66/5221
USPC .............. 403/265, 268; 156/294; 285/294.3, 285/296.1
See application file for complete search history.

(56) References Cited

U.S. PATENT DOCUMENTS

| | | | | |
|---|---|---|---|---|
| 4,190,479 | A * | 2/1980 | Smith | C09J 5/00 156/294 |
| 4,256,412 | A * | 3/1981 | Tybus | B64C 13/30 156/158 |
| 4,388,013 | A * | 6/1983 | Bergheim | B21D 39/04 285/382.4 |
| 4,721,407 | A * | 1/1988 | Liu | B62K 19/22 403/198 |
| 5,087,147 | A * | 2/1992 | Petrzelka | B29C 65/542 403/268 |
| 5,421,781 | A * | 6/1995 | Mackellar | B29C 66/5221 464/181 |
| 5,613,794 | A * | 3/1997 | Isaac | B29C 66/742 156/148 |
| 6,183,167 | B1 * | 2/2001 | Ruiz | E02D 5/285 403/379.3 |
| 6,789,822 | B1 * | 9/2004 | Metcalfe | B21D 39/04 166/206 |
| 7,517,425 | B2 * | 4/2009 | Schroeder | B62D 21/08 156/293 |
| 7,594,681 | B2 * | 9/2009 | DeCarlo | A61M 39/10 285/294.1 |
| 9,702,391 | B2 * | 7/2017 | Erlacher | F16B 13/141 |
| 10,113,675 | B2 * | 10/2018 | Puskas | F16L 13/02 |
| 2014/0112708 | A1 | 4/2014 | Carrere et al. | |
| 2016/0123380 | A1 * | 5/2016 | Godon | F16B 11/008 403/265 |

FOREIGN PATENT DOCUMENTS

| | | | |
|---|---|---|---|
| EP | 0046869 A1 * | 3/1982 | ............. F16C 3/026 |
| EP | 2722533 | 4/2014 | |
| JP | 07301374 | 11/1995 | |
| WO | 2005054694 | 6/2005 | |
| WO | 2013148621 | 10/2013 | |
| WO | 2015164704 | 10/2015 | |

OTHER PUBLICATIONS

International Patent Application No. PCT/US2015/027454, Search Report and Written Opinion dated Jul. 8, 2015.
EP15720881.0 , "Office Action", dated Oct. 17, 2019, 5 pages.

* cited by examiner

DOUBLE SHEAR BONDED JOINT AND METHOD FOR MAKING SAME

CROSS REFERENCE TO RELATED APPLICATIONS

This application is the U.S. national phase entry of International Patent Application Serial No. PCT/US2015/027454 ("the '454 application"), filed on Apr. 24, 2015, which application is related to and claims priority benefits from U.S. Provisional Application Ser. No. 61/983,610 ("the '610 application"), filed on Apr. 24, 2014, entitled "Method for Attaching Carbon Fiber Tubes to Aluminum End Fittings". The '454 and '610 applications are hereby incorporated in their entireties by this reference.

FIELD OF THE INVENTION

The field of the invention relates to mechanical joints or the like, and more particularly to bonded joints for tubes and end fittings.

BACKGROUND

Structures made from tubes and tubular elements provide high strength to weight ratios. Traditionally, these structures were manufactured from metallic tubes, which can be easily welded together to make trusses or other structural components. For improved performance and higher strength to weight ratios, new materials like composites, carbon fiber, polymers, and other materials, which are not easily welded, are being adapted for use in tubular structures.

To date, solutions for creating structures from tubular components have relied upon mating of the tubular elements with end fittings. The end fittings are typically designed so that the tubular components may slip over or into the end fitting creating a lap joint. The joint may then be bonded or mechanically fastened. However, both of these approaches lead to significant drawbacks. Lap joints often have poor bonding between the parts and are not ideal for use with adhesives. The sliding action of the tubular component onto or into the end fitting can cause a wiping action that removes the adhesive from the joint or causes air gaps to form, leading to poor bonding between the components. Furthermore, the lap joint is a joint in single shear. When the joint is loaded in tension or compression, the joint experiences offset, opposing forces that create a moment that torques the joint. As the joint bends or twists in response to the torque, a portion of the stress on the joint and adhesive may change from a shear stress to a tensile stress and cause peeling or separation of the adhesive. Adhesives, while very strong in shear, are not as effective at resisting tensile loads, and will often prematurely fail with this type of stress.

Mechanically fastened joints may alleviate some of the structural deficiencies with bonded lap joints, but present additional challenges of their own. Adding mechanical fasteners to these tubular structures increases manufacturing cost and complexity because additional steps must be taken to drill or otherwise form holes for the fasteners. Certain materials, like carbon fiber, may be difficult to drill or cut without splitting or significantly weakening the material. Fasteners may also cause wear or stress points in the tubes, causing structural failures. Fasteners may also interrupt continuous fibers in certain composites that are critical for achieving their desired strength. Tubes may be designed with integrated fastener holes that do not interrupt fiber continuity, but these tubes are often heavier than their non-fastened counterparts.

In certain cases, it may be desirable to provide a bonded joint with an end fitting that has a channel configured to accept the tubular members. The channel end fitting creates a double shear joint that maintains stress across the adhesive in shear without any bending forces and has twice the bonding area of a lap joint. The channel joint also facilitates improved bonding and simplified assembly. Adhesives or bonding agents may simply be injected into the channel, and the tubular member inserted. Because the adhesive is confined to a closed space, it will be forced back past the surfaces of the channel and tubular member. The result is a strong, void-free joint that automatically rejects excess adhesive.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a bonded joint may comprise a hollow member that may comprise a wall having a wall thickness, a receiving member that may comprise a receiving channel of complementary shape to the hollow member and having a channel width. The channel width may be greater than the wall thickness, and the hollow member may be disposed at least partially within the receiving channel and secured within the receiving channel by a bonding agent.

In come embodiments, the hollow member may comprise carbon fiber.

In certain embodiments, the receiving member may comprise aluminum.

In some embodiments, the hollow member may comprise a tube.

In certain embodiments, the tube may comprise a shape selected from the group consisting of circular, square, oval, and rectangular.

In some embodiments, the bonded joint may further comprise an alignment key.

In certain embodiments, the channel width of the receiving channel may be constant.

In some embodiments, the receiving channel may be tapered.

In some embodiments, the receiving member may be hollow.

According to certain embodiments of the present invention, a method of manufacturing a bonded joint may comprise providing a hollow member, providing a receiving member, forming a receiving channel in the receiving member that may be complementary in shape to the hollow member, injecting a bonding agent into the receiving channel, and inserting the hollow member at least partially into the receiving channel.

In some embodiments, the hollow member may comprise carbon fiber.

In certain embodiments, the receiving member may comprise aluminum.

In certain embodiments, the hollow member may comprise a tube.

In some embodiments, the tube may comprise a shape selected from the group consisting of circular, square, oval, and rectangular.

In some embodiments, the method may further comprise aligning the hollow member and the receiving channel with an alignment key.

In certain embodiments, the receiving channel may have a constant channel width.

In some embodiments, the receiving channel may be tapered.

In certain embodiments, the receiving member may be hollow.

In certain embodiments, the method may further comprise wiping excess bonding agent from the bonded joint.

According to certain embodiments of the present invention, a receiving member may comprise a receiving channel of complementary shape to a hollow member and the receiving channel may be configured to receive a bonding agent and bond to the hollow member in double shear.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a bonded joint for tubular structures. While the joints are discussed for use with tubular structures, they are by no means so limited. Rather, embodiments of the bonded joints may be used in any structure using hollow or tube-like elements that require connection of tubes.

Figure 1:
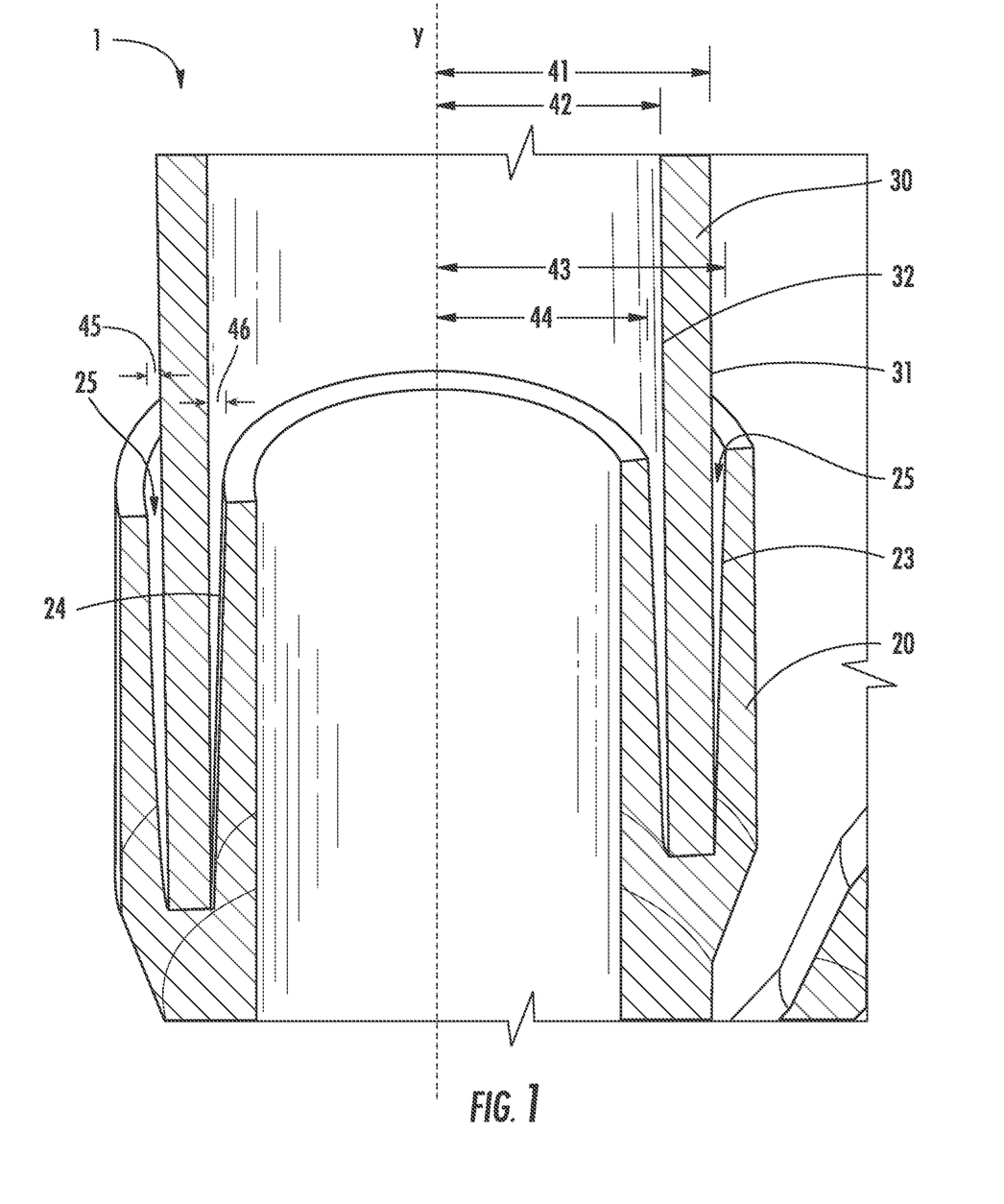
FIG. 1 is a sectional view of a bonded joint with a tapered receiving channel, according to certain embodiments of the present invention.

In some embodiments of the present invention, as shown in FIGS. 1-4C, a channel joint 1 comprises a receiving member 20 with a receiving channel 25 and a hollow member 30. FIG. 1 illustrates the channel joint 1 as a section. As depicted, the channel joint features a circular section hollow member 30 and complementary receiving channel 25. However, the hollow member 30 and/or corresponding receiving member 25 may take on any cross-sectional shape including, but not limited to, circular, square, oval, elliptical, rectangular, lobed, triangular, or any other regular or irregular shape as desired or required by a particular application. A central y-axis passes vertically through the channel joint 1 and acts as a point of reference for measurements of the hollow member 30 and receiving channel 25.

Still referring to FIG. 1, the hollow member 30 has an outer surface 31 and an inner surface 32 of the wall of the hollow member 30. The outer surface 31 and inner surface 32 may be defined by their distance from the central y-axis by their outer center distance 41 and inner center distance 42, respectively. Similarly, the receiving channel 25 has an outer channel surface 23 and an inner channel surface 24. The outer channel surface 23 and inner channel surface 24 may be defined by channel outer center distance 43 and a channel inner center distance 44, respectively. These center distances, 41, 42, 43, 44 are equivalent to radii for circular section hollow members 30 and receiving channels 25. In other embodiments, the center distances 41, 42, 43, 44 may represent a maximum, minimum, and/or average center distance at any point around a perimeter of the members 20, 30 and/or receiving channel 25.

In order for the receiving channel 25 to accept the hollow member 30, at any point along the perimeter of the hollow member 30, the inner channel surface 24 must have a channel inner center distance 44 that is less than the inner surface 32 inner center distance 42. Similarly, at any point along the perimeter of the hollow member 30, the outer channel surface 23 must have an channel outer center distance 43 that is larger than the outer surface 31 outer center distance 41. Said differently and by way of example, at any point along the perimeter of the hollow member 30, outer and inner surfaces 31, 32 of the hollow member 30 must fall between the outer and inner channel surfaces 23, 24 for the hollow member 30 to properly mate with the receiving channel 25. In certain embodiments, the thickness of the hollow member 30 wall defined by the difference in the outer center distance 41 and the inner center distance 42 must be less than the channel width of the receiving channel 25 defined by the difference in the channel outer center distance 43 and the channel inner center distance 44.

In certain embodiments, the receiving channel 25 may have an outer taper 45 and an inner taper 46, or both. The outer and inner tapers 45, 46, which in some embodiments may be approximately one degree, may serve any number of functions in the channel joint 1. For example, the outer and inner tapers 45, 46 may facilitate manufacturing. If the receiving member 20 is machined from stock material, the outer taper 45 or inner taper 46 may provide clearance for the machine tools that form the receiving channel 25. The outer and inner tapers 45, 46 may also provide an alignment function during assembly. The hollow member 30 may ride along the outer taper 45 or inner taper 46 and center itself in the receiving channel 25. Depending upon the clearance between the hollow member 30 and the receiving channel 25 and the degree of slope to the outer taper 45 or inner taper 46, the outer channel surface 23 or inner channel surface 24 may interfere with the hollow member 30 and limit the depth of insertion of the hollow member 30 into the receiving channel 25. Alternatively, other alignment or depth control measures may be compatible with the channel joint 1. For example, in certain embodiments, the hollow member 30, receiving channel 25, and/or receiving member 20 may include alignment keys, channels, protrusions, or detents. Also, in some embodiments, an assembly rig may be used to ensure proper alignment and depth of penetration of the hollow member 30 into the receiving channel 25.

Figure 2A:
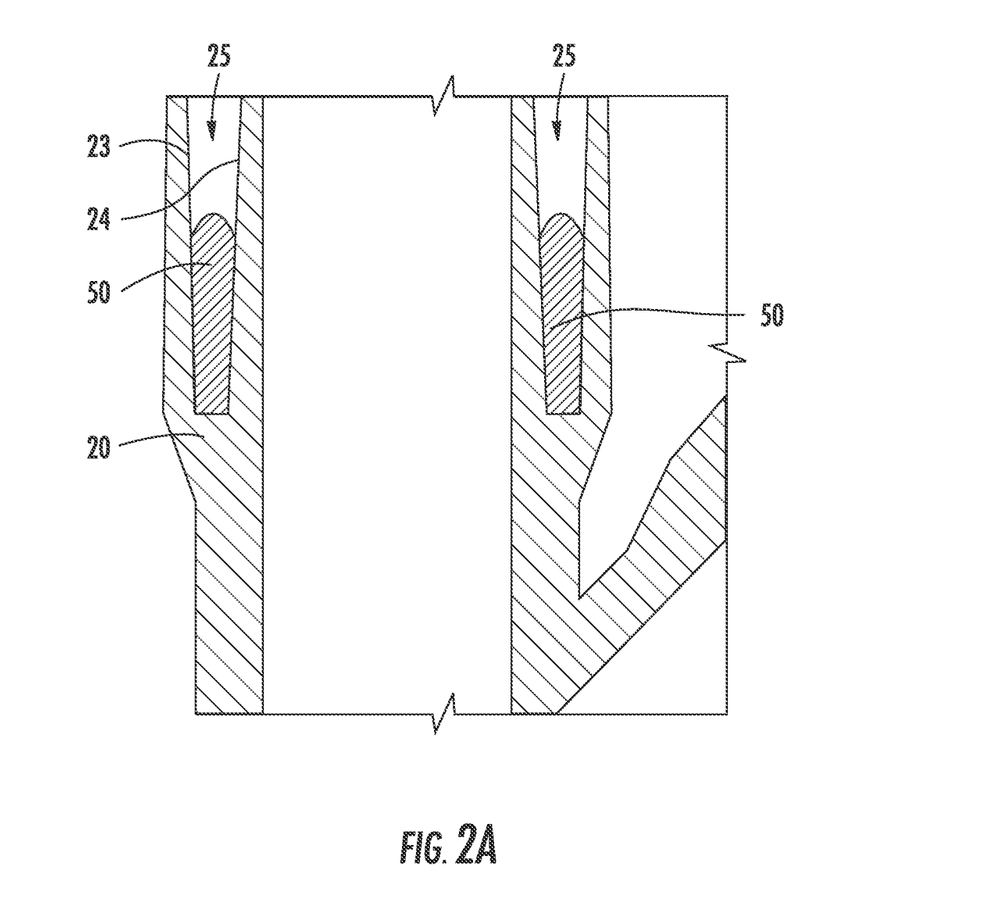
FIG. 2A is a sectional view of the tapered receiving channel of FIG. 1 with adhesive.
Figure 2B:
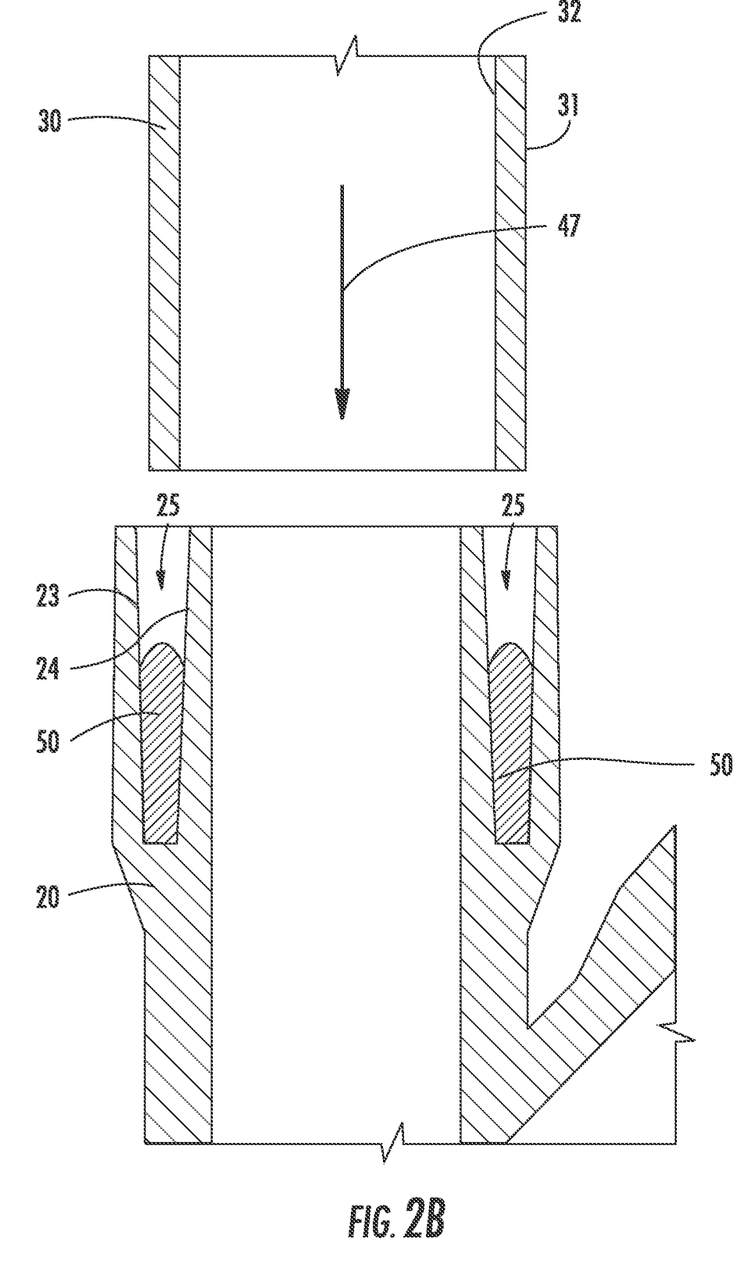
FIG. 2B is a sectional view of the bonded joint of FIG. 1 during assembly.
Figure 2C:
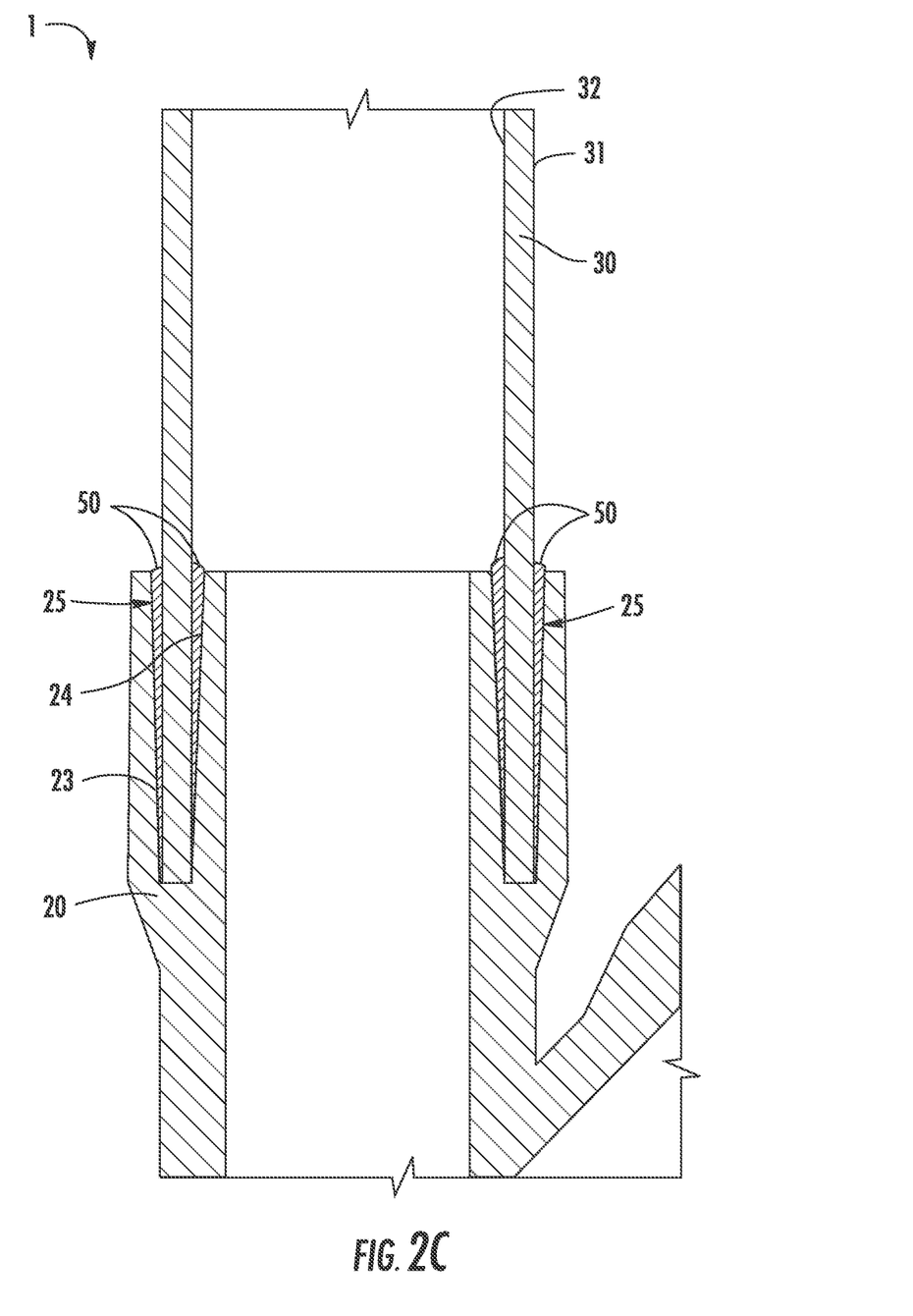
FIG. 2C is a sectional view of the bonded joint of FIG. 1 after assembly.

FIGS. 2A-2C are sectional views of the channel joint 1 of FIG. 1 during assembly. FIGS. 2A and 2B show the receiving member 20 with receiving channel 25 defined by outer channel surface 23 and inner channel surface 24. As in FIG. 1, the receiving channel 25 is tapered. The receiving channel 25 has been filled with a bonding agent or adhesive 50. The receiving channel 25 acts as a reservoir for the bonding agent or adhesive 50 to hold it and prevent spillage or loss of bonding agent or adhesive 50 during the assembly process. The bonding agent or adhesive 50 may be a glue, epoxy, resin, or any other type of bonding agent or adhesive chosen for the particular strength, ease of use, compatibility with channel joint 1 materials, and application requirements. The bonding agent or adhesive 50 may be injected, sprayed, poured, or otherwise deposited into the receiving channel 25. The amount of bonding agent or adhesive 50 deposited into the receiving channel 25 depends upon the particular clearance between the receiving channel 25 and hollow member 30, and the characteristics of the bonding agent or adhesive 50. However, to simplify manufacturing, a slight excess of bonding agent or adhesive 50 may be desirable so that the channel joint 1 will have a complete bond. The hollow member 30, with its outer surface 31 and inner surface 32, is shown in FIG. 2B just prior to insertion into the receiving member 20. The hollow member 30 will follow the insertion motion 47 to mate with the receiving channel 25 of the receiving member 20.

In FIG. 2C, the hollow member 30 has been inserted into the receiving channel 25 of the receiving member 20 to form the channel joint 1. The outer surface 31 of the hollow member 30 is adjacent to the outer channel surface 23 of the receiving channel 25. Similarly, the inner surface 32 of the hollow member 30 is adjacent to the inner channel surface 24 of the receiving channel 25. The bonding agent or adhesive 50 has been displaced in the receiving channel 25 and filled the voids between the hollow member 30 and receiving channel 25. Any excess bonding agent or adhesive 50 will be expelled at the top end of the receiving channel 25 as shown. Because the bonding agent or adhesive 50 is deposited in the closed space of the receiving channel 25, the seal effected between the receiving member 20 and hollow member 30 is much less likely to contain voids and other imperfections that would impact bond strength. As the hollow member 30 is inserted into the receiving channel 25, there is no wiping action of the hollow member 30 displacing the bonding agent or adhesive 50 in the direction of insertion motion 47. Rather, the bonding agent or adhesive 50 will be forced in a direction opposite to that of the insertion motion 47, backfilling the voids between the hollow member 30 and the receiving channel 25. By using a slight excess of bonding agent or adhesive 50, the excess will be expelled out the top of the receiving channel 25 where it may be easily cleaned, leaving the channel joint 1 with the ideal amount of adhesive for a strong bond.

Figure 3:
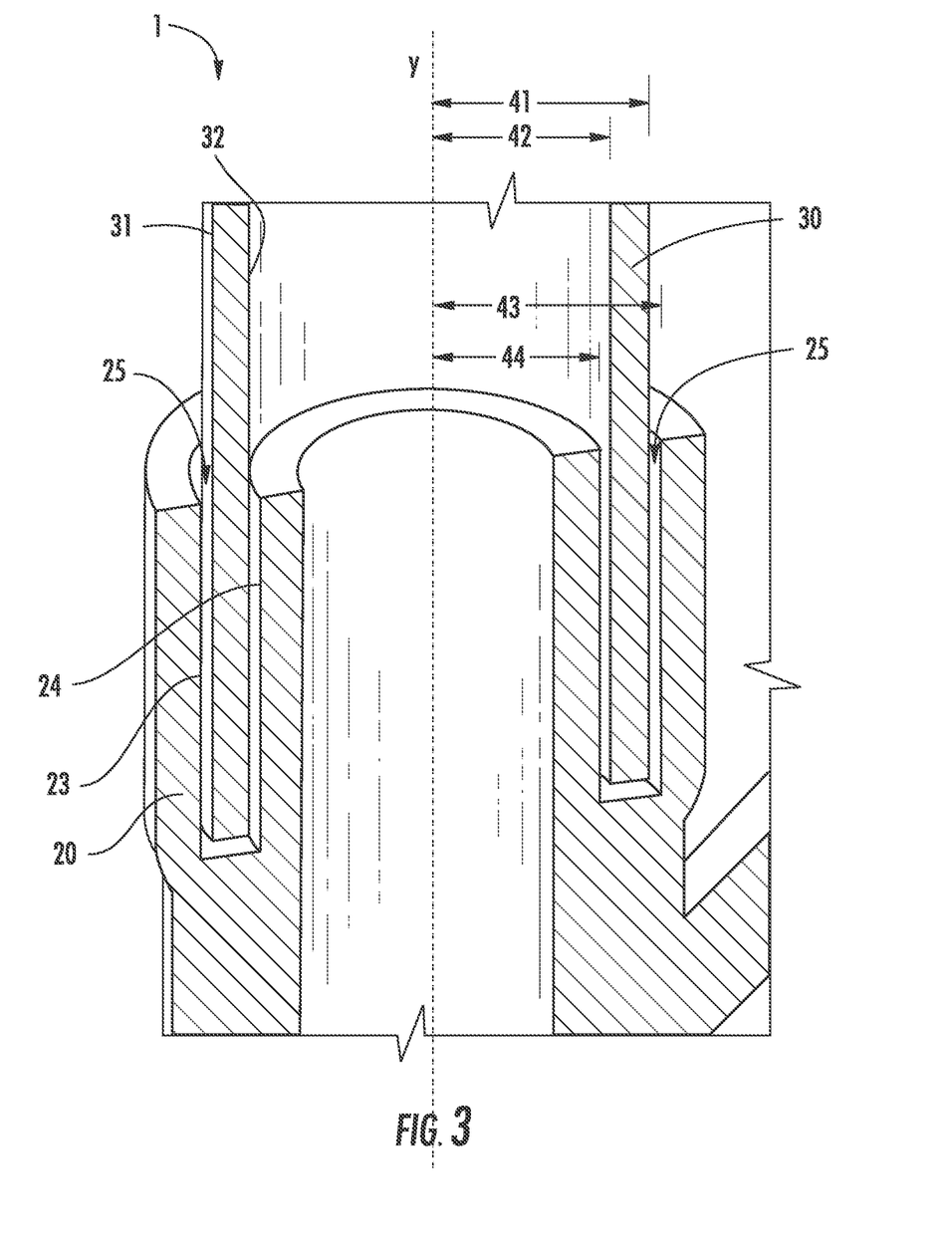
FIG. 3 is a sectional view of a bonded joint with a straight receiving channel, according to certain embodiments of the present invention.

FIG. 3 is a sectional view of a channel joint 1 comprising a receiving member 20 and a hollow member 30. The receiving member 20 comprises a receiving channel 25 defined by outer channel surface 23 and inner channel surface 24. The hollow member 30 comprises an outer surface 31 and an inner surface 32. As in FIG. 1, a central y-axis passes vertically through the channel joint 1 and serves as a point of reference for the outer center distance 41 of the outer surface 31, the inner center distance 42 of the inner surface 32, the channel outer center distance 43 of the outer channel surface 23, and the channel inner center distance 44 of the inner channel surface 24.

The embodiment of FIG. 3 is similar to the embodiment of FIG. 1 with the exception of the receiving channel 25 being straight and without outer taper 45 and inner taper 46 noted above. The straight receiving channel 25 lacks the self-aligning features of the tapered receiving channel 25 of FIG. 1. However, the straight receiving channel 25 of FIG. 3 may offer a more consistent bond between the receiving member 20 and the hollow member 30 because the gap between the receiving member 20 and hollow member 30 is substantially constant throughout the bond. All of the other features discussed in reference to FIG. 1 above, including variations to shape and other alignment and insertion depth control features, may be similarly applicable to the embodiment of FIG. 3.

Figure 4A:
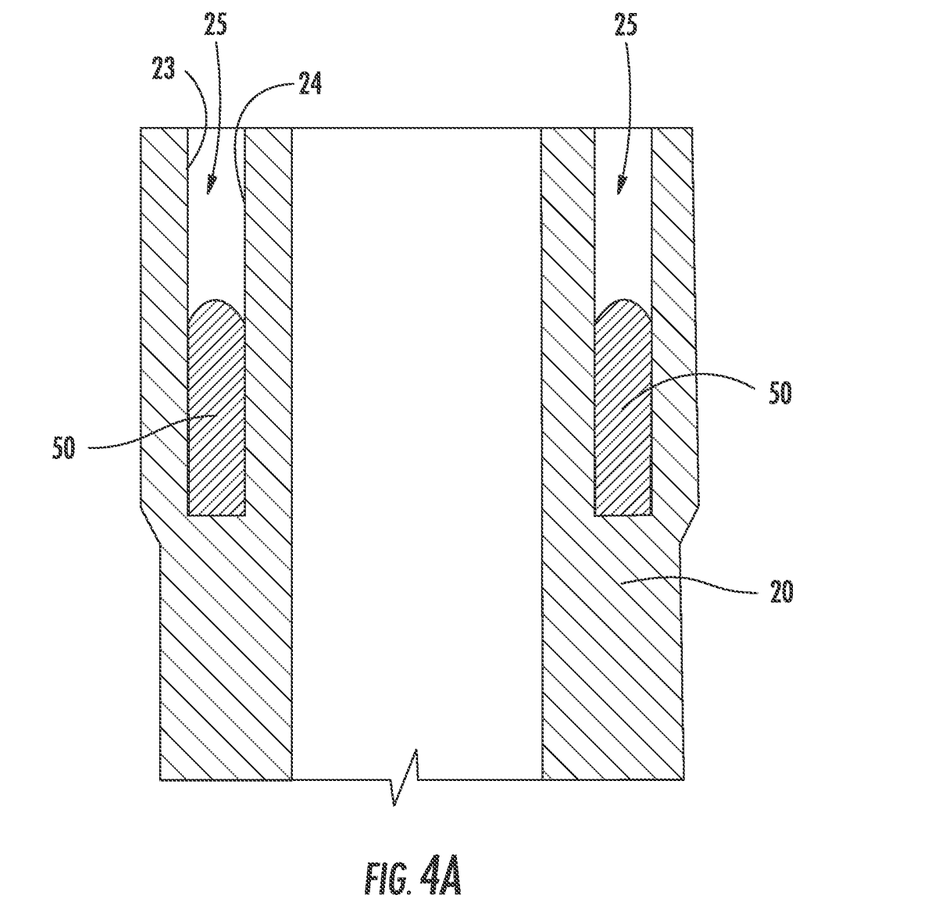
FIG. 4A is a sectional view of the straight receiving channel of FIG. 3 with adhesive.
Figure 4B:
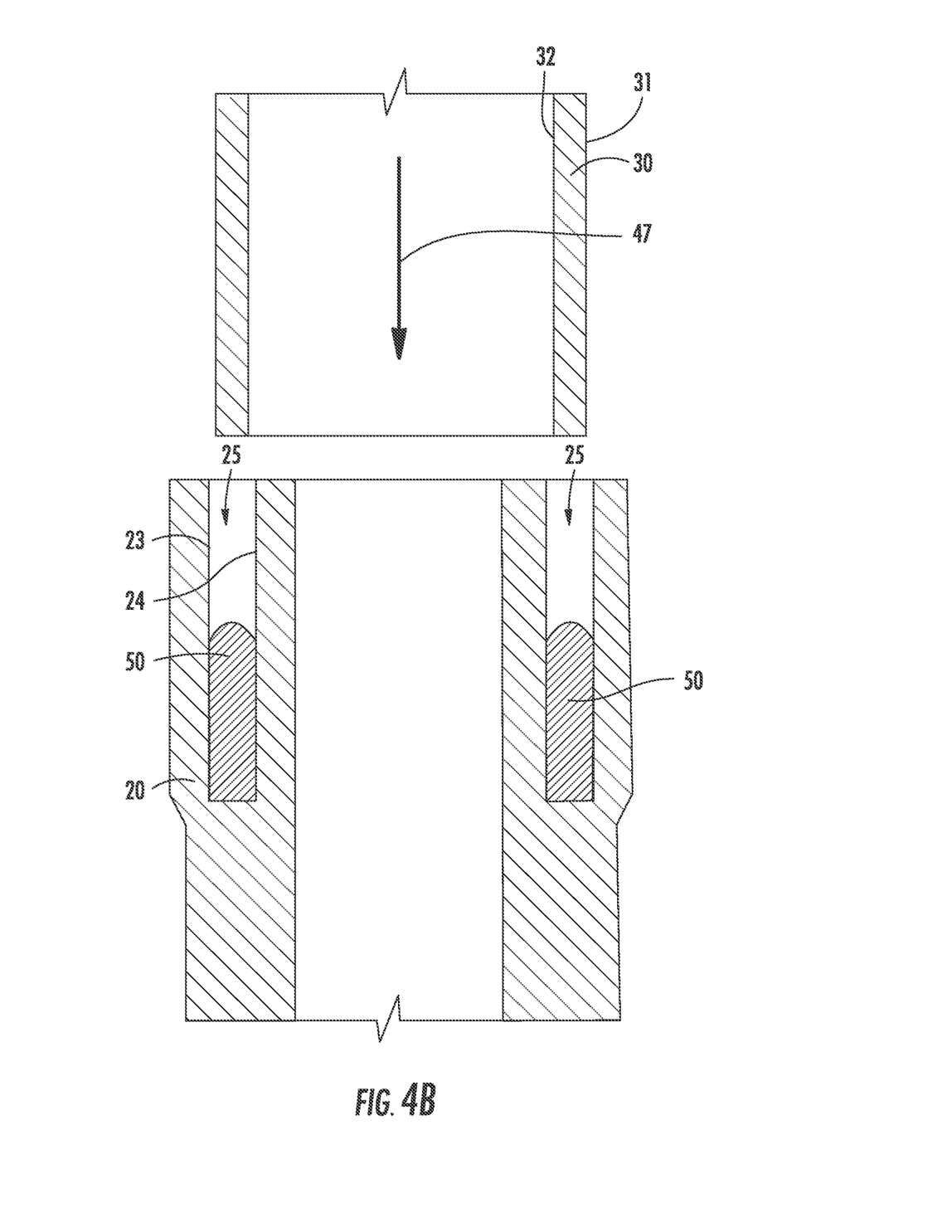
FIG. 4B is a sectional view of the bonded joint of FIG. 3 during assembly.
Figure 4C:
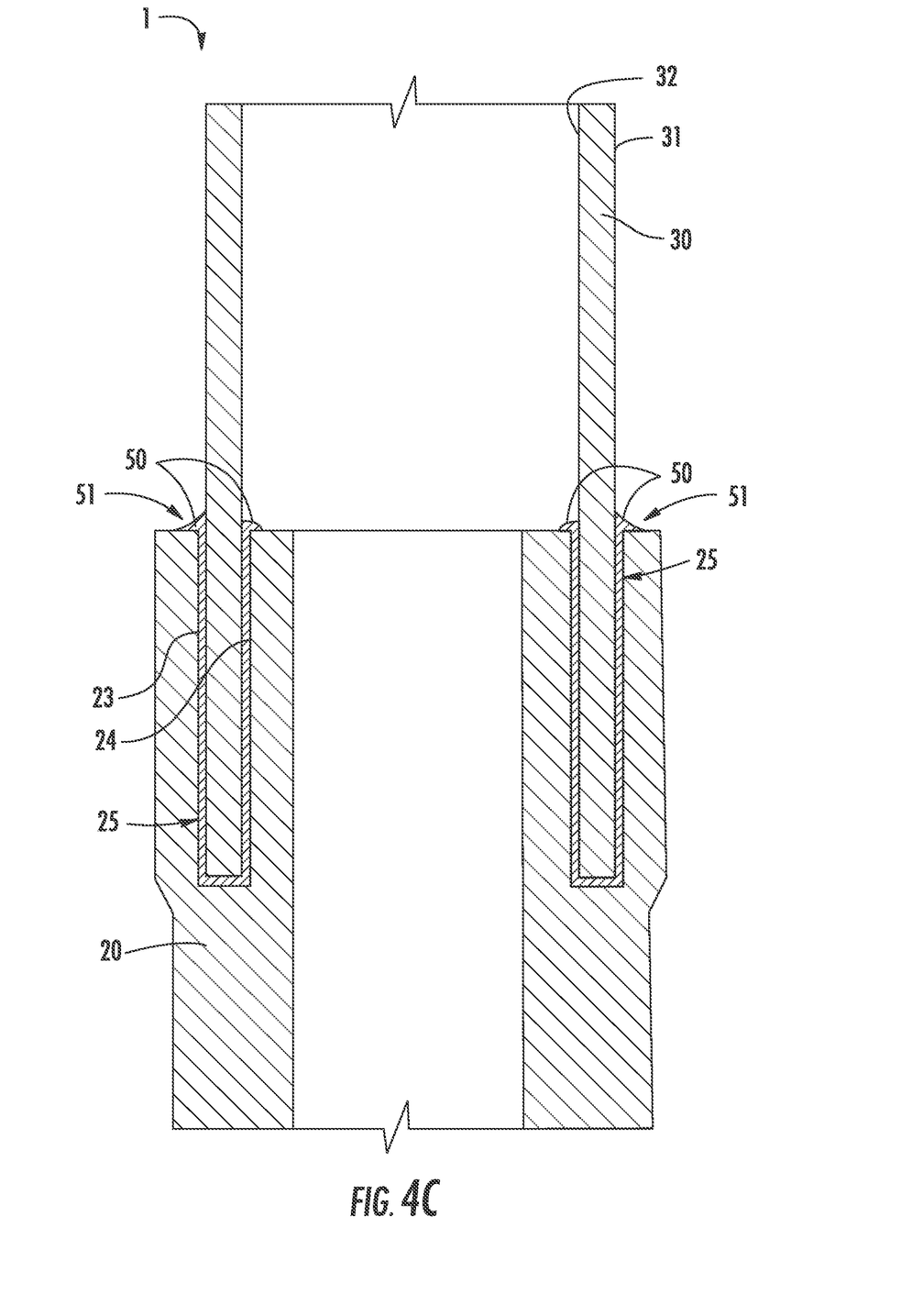
FIG. 4C is a sectional view of the straight receiving channel of FIG. 3 after assembly.

FIGS. 4A-4C are sectional views of the channel joint 1 of FIG. 3 during assembly. Receiving channel 25 of receiving member 20, defined by outer channel surface 23 and inner channel surface 24, has bonding agent or adhesive 50 deposited or injected within it. The hollow member 30 with outer surface 31 and inner surface 32 moves along the path of insertion motion 47 to engage the receiving channel 25 of the receiving member 20. During insertion of the hollow member 30 into the receiving channel 25, bonding agent or adhesive 50 is displaced in a direction substantially opposite from the insertion motion 47 to backfill the voids between the outer surface 31 and the outer channel surface 23, as well as the voids between the inner surface 32 and the inner channel surface 24. Excess bonding agent or adhesive 50 will be expelled from the upper portion of the receiving channel 25. In certain embodiments, the excess bonding agent or adhesive 50 may be wiped clean in such a way as to form a radius 51 in the bonding agent or adhesive 50. The radius 51 provides a smooth, clean finish to the channel joint 1 and helps alleviate stress concentrations that might occur from a sharp or irregular bonding agent or adhesive 50 surface.

Referring to FIGS. 1-4, in certain embodiments, the channel joint 1 provides a joint in double shear that maintains the bonding agent or adhesive 50 in shear stress, even when varying forces are applied to the channel joint 1. Furthermore, the channel joint 1 provides bonding between both the outer surface 31 and inner surface 32 of the hollow member 30 and the receiving channel 25, giving approximately double the bond area of a lap joint.

Still referring to FIGS. 1-4, in some embodiments, the bond between the hollow member 30 and the receiving member 20 is faster and easier to produce, while still providing enhanced joint quality. The reverse-flow action of the bonding agent or adhesive 50 compared to the insertion motion 47 of the hollow member 30 helps ensure that the bonding agent or adhesive 50 provides a complete seal with no air gaps or breaks to the bond line. In certain embodiments, particularly in channel joints 1 with dissimilar or incompatible materials, the bonding agent or adhesive 50 provides a barrier between the dissimilar materials to prevent or slow galvanic corrosion that would otherwise weaken the channel joint 1 and cause premature failures. In certain embodiments, the channel joint 1 may include fasteners, collars, or other features that improve joint strength. Also, while the receiving member 20 is shown as a hollow component, primarily for lightness, the receiving member may also be solid to provide extra strength, reduce the number of manufacturing steps, provide a seal to the structure to prevent moisture or debris from entering, or to prevent fluid flows from escaping. Similarly, the hollow member 30 may not be hollow along its entire length. While the hollow member 30 may require a hollow or flanged end to mate with the receiving channel 25 of the receiving member 20, portions of the hollow member 30 may be solid for added strength, prevention of ingress or egress of material or fluid flows, or simplified manufacturing.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to aluminum, stainless steel, fiber reinforced plastics, carbon fiber, composites, polycarbonate, polypropylene, other metallic materials, or other polymers may be used to form any of the above described components.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A bonded joint comprising:
    a hollow member formed of a first material and comprising a wall, the wall having a wall thickness;
    a monolithic receiving member formed of a second material and comprising a receiving channel of complementary shape to the hollow member, the monolithic receiving member comprising an inner channel surface, an outer channel surface, and a channel width, wherein:
    the first material and the second material are subject to corrosion when placed in contact with each other;
    the channel width is greater than the wall thickness;
    at least one of the inner channel surface or the outer channel surface comprises a continuous linear taper along a full length thereof such that the channel width has a maximum value at an opening of the receiving channel and a minimum value at an end of the receiving channel;
    the hollow member is disposed at least partially within the receiving channel;
    the hollow member is secured within the receiving channel by a bonding agent that provides a barrier against corrosion between the first and second materials; and
    the inner channel surface and the outer channel surface comprise symmetric continuous linear tapers along full lengths thereof.

2. The bonded joint of claim 1, wherein the hollow member comprises carbon fiber.

3. The bonded joint of claim 2, wherein the monolithic receiving member comprises aluminum.

4. The bonded joint of claim 1, wherein the hollow member comprises a tube comprising a shape selected from the group consisting of circular, square, oval, and rectangular.

5. The bonded joint of claim 1, wherein the monolithic receiving member comprises an expanded diameter portion on an outer surface thereof, wherein the expanded diameter portion approximately corresponds to a location of the end of the receiving channel.

6. The bonded joint of claim 1, wherein the symmetric continuous linear tapers are each approximately 1°.

7. The bonded joint of claim 1, wherein the monolithic receiving member comprises an internal width that is constant along a full length of the receiving channel.

8. The bonded joint of claim 1, wherein the monolithic receiving member is hollow.

9. The bonded joint of claim 1, wherein the inner channel surface and the outer channel surface of the receiving channel terminate approximately a same distance away from the end of the receiving channel opposite the opening.

10. The bonded joint of claim 1, wherein the second material of the monolithic receiving member further forms a receiving portion and an elongate tubular portion, the receiving portion comprising the receiving channel of complementary shape to the hollow member, the elongate tubular portion having a non-tapered channel-less solid thickness extending from the receiving portion a distance at least half as long as a length of the receiving channel.

11. The bonded joint of claim 10, wherein at least one of:
    the receiving portion comprises a transition portion that tapers from a larger outer width adjacent an end of the receiving channel to a smaller outer width adjacent an end of the elongate tubular portion; or
    the monolithic receiving member further comprises an angular extension extending from the elongate tubular portion at an angle relative to a central axis of the elongate tubular portion.

12. The bonded joint of claim 10, wherein:
    the hollow member comprises carbon fiber; and
    the monolithic receiving member comprises aluminum.

13. A method of manufacturing a bonded joint, the method comprising:
    providing a hollow member formed of a first material;
    providing a monolithic receiving member formed of a second material, wherein the first material and the second material are subject to corrosion when placed in contact with each other;
    forming a receiving channel in the monolithic receiving member complementary in shape to the hollow member;
    injecting a bonding agent into the receiving channel and that provides a barrier against corrosion between the first and second materials; and
    inserting the hollow member at least partially into the receiving channel, wherein the receiving channel comprises a channel width with a continuous linear taper along a full length thereof such that the channel width has a maximum value at an opening of the receiving channel and a minimum value at an end of the receiving channel, wherein an inner channel surface and an outer channel surface of the receiving channel each comprise symmetric continuous linear tapers along full lengths thereof.

14. The method of claim 13, the monolithic receiving member comprises aluminum.

15. The method of claim 14, wherein the hollow member comprises carbon fiber.

16. The method of claim 13, wherein the hollow member comprises a tube comprising a shape selected from the group consisting of circular, square, oval, and rectangular.

17. The method of claim 13, further comprising forming an expanded diameter portion on an outer surface of the monolithic receiving member, wherein the expanded diameter portion approximately corresponds to a location of the end of the receiving channel.

18. The method of claim 13, wherein the symmetric continuous linear tapers are each approximately 1°.

19. The method of claim 13, further comprising forming the monolithic receiving member with an internal width that is constant along a full length of the receiving channel.

20. The method of claim 13, wherein the monolithic receiving member is hollow.

21. The method of claim 13, further comprising wiping excess bonding agent from the bonded joint.

22. The method of claim 13, wherein the inserting the hollow member is performed after injecting the bonding agent.

\* \* \* \* \*